(12) United States Patent
Hill et al.

(10) Patent No.: US 10,353,156 B2
(45) Date of Patent: *Jul. 16, 2019

(54) PUSHABLE MULTI-FIBER CONNECTOR

(71) Applicant: Clearfield, Inc., Minneapolis, MN (US)

(72) Inventors: John Paul Hill, Andover, MN (US);
Walter E. Power, Jordan, MN (US);
Yuki Nishiguchi, Marlborough, MA (US)

(73) Assignee: Clearfield, Inc., Minneapolis, MN (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/714,327

(22) Filed: Sep. 25, 2017

(65) Prior Publication Data

US 2018/0011261 A1 Jan. 11, 2018

Related U.S. Application Data

(63) Continuation of application No. 15/193,363, filed on Jun. 27, 2016, now Pat. No. 9,772,457, which is a (Continued)

(51) Int. Cl.
*G02B 6/38* (2006.01)
*G02B 6/44* (2006.01)
(Continued)

(52) U.S. Cl.
CPC ........... *G02B 6/3885* (2013.01); *G02B 6/387* (2013.01); *G02B 6/3821* (2013.01);
(Continued)

(58) Field of Classification Search
CPC .. G02B 6/3821; G02B 6/3825; G02B 6/3849;
G02B 6/387; G02B 6/3882;
(Continued)

(56) References Cited

U.S. PATENT DOCUMENTS 6,396,993 B1 5/2002 Giebel et al.
9,383,539 B2 * 7/2016 Hill ......................... B01D 53/62
(Continued)

OTHER PUBLICATIONS

Extended European Search Report and European Search Opinion, dated May 9, 2018 from related European Patent Application No. 15845371.2.

*Primary Examiner* — Michael P Mooney
(74) *Attorney, Agent, or Firm* — Pepper Hamilton LLP

(57) ABSTRACT

Multi-fiber, fiber optic cable assemblies may be configured so that the terminal ends of the cables have pre-assembled back-post assemblies that include pre-assembled ferrules, such as MPO ferrules that meet the requisite tolerances needed for fiber optic transmissions. To protect the pre-assembled components from damage prior to and during installation, pre-assembled components may be enclosed within a protective housing. The housing with pre-assembled components may be of a size smaller than fully assembled connectors so as to be sized to fit through a conduit. The remaining connector housing components for the multi-fiber connectors may be provided separately and may be configured to be attached to the back-post assembly after installation of the cable.

20 Claims, 17 Drawing Sheets

Related U.S. Application Data continuation of application No. 14/863,162, filed on Sep. 23, 2015, now Pat. No. 9,383,539.

(60) Provisional application No. 62/054,322, filed on Sep. 23, 2014.

(51) Int. Cl.
  *G02B 6/50* (2006.01)
  *B01D 53/62* (2006.01)
  *B01D 53/73* (2006.01)
  *B01D 53/78* (2006.01)
  *B65G 5/00* (2006.01)

(52) U.S. Cl.
  CPC ......... *G02B 6/3825* (2013.01); *G02B 6/3849* (2013.01); *G02B 6/3882* (2013.01); *G02B 6/3887* (2013.01); *G02B 6/3897* (2013.01); *G02B 6/4463* (2013.01); *G02B 6/4471* (2013.01); *G02B 6/4476* (2013.01); *G02B 6/50* (2013.01); *B01D 53/62* (2013.01); *B01D 53/73* (2013.01); *B01D 53/78* (2013.01); *B01D 2251/304* (2013.01); *B01D 2251/306* (2013.01); *B01D 2251/402* (2013.01); *B01D 2251/404* (2013.01); *B01D 2251/60* (2013.01); *B01D 2257/302* (2013.01); *B01D 2257/404* (2013.01); *B01D 2257/504* (2013.01); *B01D 2257/60* (2013.01); *B01D 2257/602* (2013.01); *B01D 2257/708* (2013.01); *B01D 2258/0283* (2013.01); *B65G 5/00* (2013.01); *G02B 6/4459* (2013.01); *Y02C 10/04* (2013.01); *Y02C 10/14* (2013.01); *Y02P 20/152* (2015.11)

(58) Field of Classification Search
  CPC .. G02B 6/3885; G02B 6/3887; G02B 6/3897; G02B 6/4459; G02B 6/4463; G02B 6/4471; G02B 6/4476; G02B 6/50; B01D 2251/304; B01D 2251/306; B01D 2251/402; B01D 2251/404; B01D 2251/60; B01D 2257/302; B01D 2257/404; B01D 2257/504; B01D 2257/60; B01D 2257/602; B01D 2257/708; B01D 53/62; B01D 53/78; B01D 53/73; B01D 2258/0283; Y02C 10/04; Y02C 10/14; Y02C 10/152; B65G 5/00; Y02P 20/152
  USPC ...................................... 385/53–87, 134–139
  See application file for complete search history.

(56) References Cited

U.S. PATENT DOCUMENTS

| | | | | |
|---|---|---|---|---|
| 9,772,457 | B2* | 9/2017 | Hill | G02B 6/3885 |
| 2005/0129375 | A1* | 6/2005 | Elkins, II | G02B 6/4472 |
| | | | | 385/100 |
| 2006/0280413 | A1* | 12/2006 | Paschal | G02B 6/443 |
| | | | | 385/112 |
| 2009/0060419 | A1* | 3/2009 | Lu | G02B 6/4439 |
| | | | | 385/56 |
| 2010/0322584 | A1 | 12/2010 | Kowalczyk et al. | |
| 2014/0029899 | A1* | 1/2014 | Isenhour | G02B 6/3829 |
| | | | | 385/79 |

* cited by examiner

PUSHABLE MULTI-FIBER CONNECTOR

CROSS-REFERENCE TO RELATED APPLICATIONS

This application is a continuation of U.S. application Ser. No. 15/193,363, filed Jun. 27, 2016, which is a continuation of Ser. No. 14/863,162, filed Sep. 23, 2015, which claims the benefit of U.S. Provisional Application No. 62/054,322, filed Sep. 23, 2014.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adaptor to align the fibers such that the light can transmit without interruption.

The connector in joining fiber ends, for example, has, as its primary function, the maintenance of the fiber ends in an abutting relationship such that the core of one of the fibers is axially aligned with the core of the other fiber to maximize light transmissions from one fiber to the other. Another goal is to minimize back reflections. An alignment can be extremely difficult to achieve, as a good alignment (low insertion loss) of the fiber ends is a function of the alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects. These same considerations apply to arrangements where the fiber, terminated in a plug connector, is to be used with active or passive devices, such as, for example, computers or transceivers and the like.

There are numerous, different, connector designs in use for achieving low insertion loss and stability. Some example connectors may include, but are not limited to, SC, Dual LC, LC, ST and MPO connectors. In most of these designs, a pair of ferrules (one in each connector, or one in the connector and one in the apparatus or device), each containing an optical fiber end, are butted together end to end and light travels across the junction. Zero insertion loss requires that the fibers in the ferrules be exactly aligned, a condition that, given the necessity of manufacturing tolerances and cost considerations, is virtually impossible to achieve, except by fortuitous accident. As a consequence, most connectors are designed to achieve a useful, preferably predictable, degree of alignment.

Therefore, since the mechanical tolerances involved in terminating optical fiber are stringent in most applications, optical fiber is generally not terminated on site. In situations wherein optical fiber must be terminated on site, it may take a skilled technician between about 15 to 20 minutes to splice the fibers together using specialized splicing equipment. Optical fiber is therefore often provided in a range of different lengths, pre-terminated at both ends with a connector plug ready to plug into a matching receptacle.

In many installations, optical fiber cables are routed through a protective conduit that not only protects the cable, but also allows for rapid restoration methods when the conduit, fiber optic cable, or both are cut or damaged and replacement is necessary. Since pre-installed connectors are of an industry standard footprint, the fully assembled connectors may be too large to be pushed or pulled through microduct because of size constraints, as some microducts may have internal diameters of only about 6 mm, essentially large enough for the cables to fit through, but not a fully assembled connector.

While single and dual fiber connectors are of a smaller size and are more readily adaptable to fit through a conduit, it has also become desirable to provide partially assembled connectors for multi-fiber connectors, such as MPO connectors, that are partially pre-assembled with requisite tolerances, and that may be able to be pushed or pulled through a conduit. Any additional final assembly of the connector components may then be performed on site once the objective of delivering the fiber through a length of microduct has been achieved. Likewise, there is also a need for pre-assembled multi-fiber cables and cable connectors that have a footprint that allows for the pre-assembled cables to be inserted through minimal diameter conduit to thereby minimize the intrusion of placing the pathway or conduit for the fiber optic network, while also minimizing on-site assembly time and costs.

SUMMARY

To reduce the high cost of needing splicing technicians deployed on site to terminate ends of fiber optic cables, the multi-fiber fiber optic cable assemblies may be configured so that the terminal ends of the cables have pre-installed back-post assemblies that include pre-installed ferrules that meet the requisite tolerances needed for fiber optic transmissions. To protect the ferrule from damage during installation though a conduit, the ferrule assembly may be enclosed within a protective enclosure. The remaining connector housing may be provided separately and may be configured to be attached to the back-post assembly after installation of the cable.

According to one aspect, there is provided a terminal assembly for a multi-fiber optical cable, comprising a back post member configured to couple to the multi-fiber optical cable, a ferrule, an insert configured to align with the ferrule, the insert being one of a pin holder insert and a pin alignment insert, and a housing including a first housing component and a second housing component configured to couple to the first housing component so as to form at least one chamber therebetween for receiving at least the ferrule, each of the first and second housing components being further configured to couple to the back post member.

In some embodiments, at least one chamber may be configured to further receive the insert. In some embodiments, the terminal assembly may further comprise a biasing member disposed between the back post member and the insert, the back post member including a cavity configured to receive the biasing member. In some embodiments, the ferrule may be an MPO ferrule.

In various embodiments, a maximum first dimension of the back post member in a first transverse cross-sectional direction may be in a range of about 5 mm to about 9 mm. A maximum width of each of the first housing component and the second housing component may be about the same as the maximum first dimension of the back post member. A maximum second dimension of the back post member in a second transverse cross-sectional direction may be less than the maximum first dimension so as to accommodate each of the first housing component and the second housing component. The housing may be configured such that a maximum dimension of the terminal assembly in a transverse direction, when the first housing component and the second housing component are coupled to the back post member, is about the same as the maximum first dimension of the back post member.

The back post member may include a slot, and at least one of the first housing component and the second housing component may include a projection configured to engage the slot so as to couple to the back post member. In some embodiments, the back post member may include a longitudinal slot and a transverse slot, and at least one of the first housing component and the second housing component may include a longitudinal projection configured to engage the longitudinal slot, and a transverse projection configured to engage the transverse slot.

The back post member may include a first external surface and a second external surface on opposite sides thereof, the first external surface being configured to mate with the first housing component and the second external surface being configured to mate with the second housing component. One of the first housing component and the second housing component may include a hook and the other one may include a socket configured to receive the hook so as to couple the first housing component to the second housing component.

In some embodiments, the terminal assembly may further include a ripcord configured to facilitate decoupling of the first housing component from the second housing component. The terminal assembly may further comprise a heat shrink member configured to enclose the housing, wherein each of the first housing component and the second housing component includes a longitudinal slot configured to receive the ripcord positioned beneath the heat shrink member, a free end of the ripcord being accessible to allow pulling the ripcord from the longitudinal slots, thereby tearing the heat shrink member. In some embodiments, the terminal assembly may further comprise a crimp ring configured to couple the back post member to the multi-fiber optical cable, at least one end of the ripcord being arranged on the crimp ring. In other embodiments, at least one end of the ripcord may be crimped to the multi-fiber optical cable.

In some embodiments, the terminal assembly may further comprise a ferrule boot disposed between the ferrule and the insert. In some embodiments, the insert may be a pin holder insert, the terminal assembly further comprising a plurality of alignment pins protruding through at least the pin holder insert and the ferrule.

In some embodiments, each of the first housing component and the second housing component may have a longitudinal semi-cylindrical profile configured to facilitate passage of the terminal assembly through a microduct having an internal diameter less than or equal to about 6 mm. The first housing component and the second housing component may be removable from the terminal assembly and replaceable by an outer housing having a diameter greater than about 6 mm.

DETAILED DESCRIPTION

Optical ferrules which are standardized according to JIS C 5981, IEC 61754-5 and the like, are called MT (Mechanically Transferable) ferrules, and are used for connecting optical fibers. MT ferrules generally use at least two guide pins for high-accuracy positioning of each optical fiber in the ferrule, and may have a plurality of optical fiber holes for receiving the optical fibers. The respective optical fibers may be inserted into the optical fiber insertion holes from a rear end of the MT ferrule, and may be fixed in place with adhesive. The number of optical fibers present may vary. Some examples of the number of fibers may include, but are not limited to 4, 6, 8, or 12, or as future developments occur, more than 12, or any number between any of the listed values.

MT ferrules generally have a rectangular cross-sectional shape. Two MT ferrules, one with guide pins installed (male connector) and one without guide pins (female connector) are typically inserted into opposite ends of an adapter whereby the ferrules are aligned together with one another as the male guide pins enter the female guide pin holes. One type of connector that uses MT ferrules is an MPO (multi-fiber push-on) connector.

Figure 1:
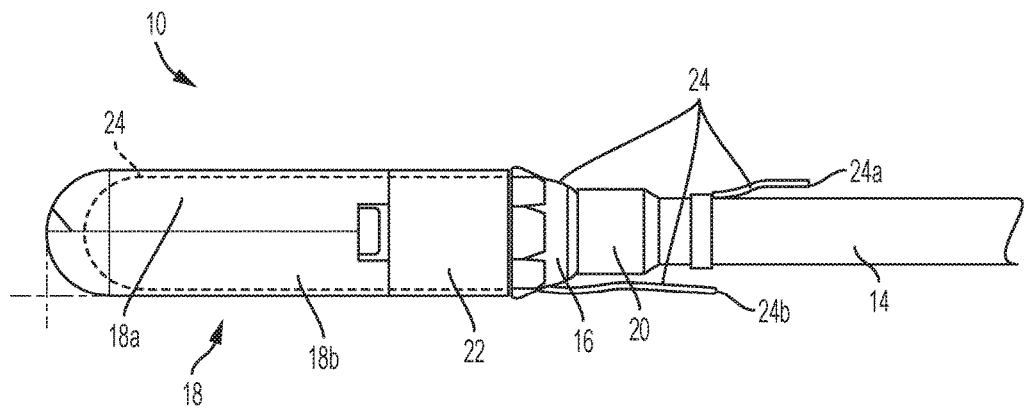
FIG. 1 depicts a pre-assembled cable end for a multi-fiber fiber optic cable according to an embodiment.

To deliver multiple terminations, for example, twelve terminations, in a single industry-standard footprint through a small duct footprint would allow for installation sites to reduce, or even eliminate, the need for high skilled laborers to perform a splice to another cable or connector in the field. As represented in FIG. 1, a fiber optic cable 14 may be provided with a terminal assembly 10 that includes a pre-assembled ferrule (36 in FIG. 2), as discussed further below. The assembly 10 may include a back-post member 16 that may include an assembled ferrule, and a housing 18 that may include two housing components 18a (upper in the figure) and 18b (lower in the figure). In an embodiment as shown, each of the housing components 18a, 18b may provide about a half (half-shells) of the housing 18. Or alternatively, though not depicted, one of the housing components 18a, 18b may provide a larger housing proportion as compared to the other, for example, ⅔ and ⅓, or ¾ and ¼, or various other proportions as may be required for alternate configurations. The cable 14 may be fastened to, and maintained with the back post member 16 by a crimp ring 20, or by other types of cable retention system.

In an embodiment as depicted in FIG. 1, a heat-shrink member 22, which may be essentially cylindrical in shape, may be disposed around the housing components 18a, 18b, to hold the housing components together once mated with one another. Once mated, the heat shrink member 22 may be inserted over the mated components and heated, for example with a heated air stream, to shrink the heat-shrink member tightly around the housing components 18a, 18b to hold the components together. In alternative embodiments, the housing components 18a, 18b may be joined and held together by other types of fastening devices, such as, for example, adhesive tape, integral snaps, screws, wires, strings, elastic bands, or alternative retention systems.

For embodiments wherein adhesive tape, or the heat-shrink member 22, or the like may be used as the retaining device for holding the housing components 18a, 18b together, a rip-cord 24, described in greater detail below, may be provided to tear through the adhesive tape, or the heat-shrink member to allow for easier removal of the retaining device and separation of the housing components.

A cable 14 terminated in a manner as depicted may provide for a plug n' play approach to cable installation, which, in simplified form would require placing the cable where needed and then simply plugging the already pre-assembled ferrule into an adapter for joining with, for example another ferrule.

While a pre-assembled fiber optic cable may be installed without a guide, or protective conduit, the pre-installed housing 18 may be configured to be pushed, or pulled through a pre-installed conduit that is of a size that would allow for unobstructed passage of the housing therethrough. A fully assembled multi-fiber connector, such as a "multi-fiber push on" MPO connector depicted in FIG. 6, has required dimensions that are defined by industry recognized standards. A terminal assembly 10 may be configured to have dimensions that are smaller than those of a fully assembled connector, thereby allowing the user to express, by pushing or pulling, the MPO connector through a microduct with an inner diameter that is smaller than the traditional fully assembled MPO connector.

Figure 2:
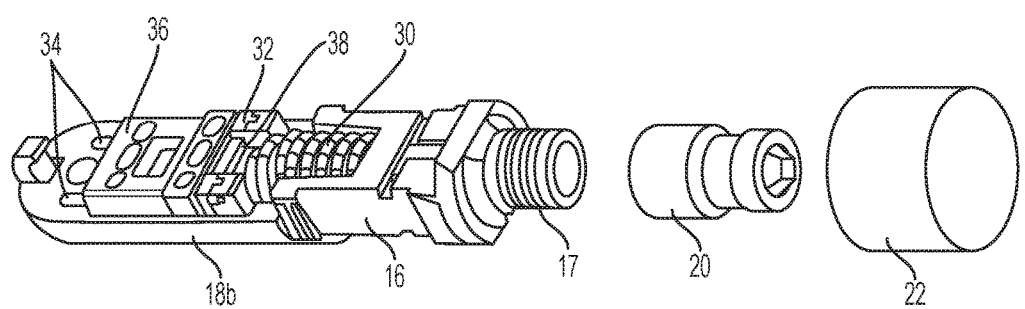
FIG. 2 depicts a partially dis-assembled view of a pre-assembled cable end that includes a male connector according to an embodiment.
Figure 3:
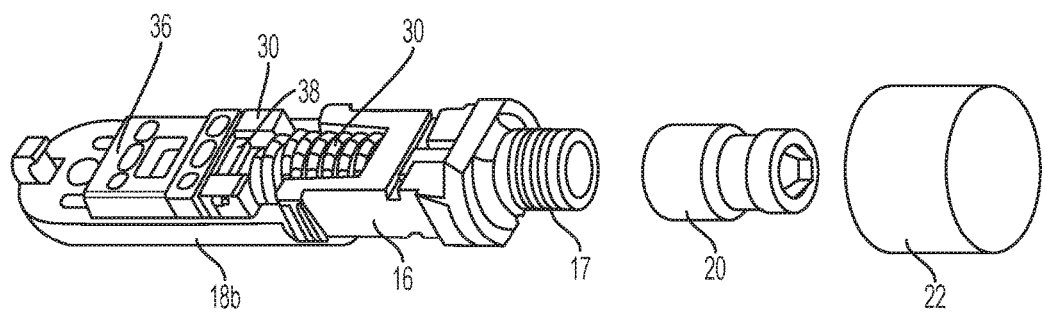
FIG. 3 depicts a partially dis-assembled view of a pre-assembled cable end that includes a female connector according to an embodiment.
Figure 4:
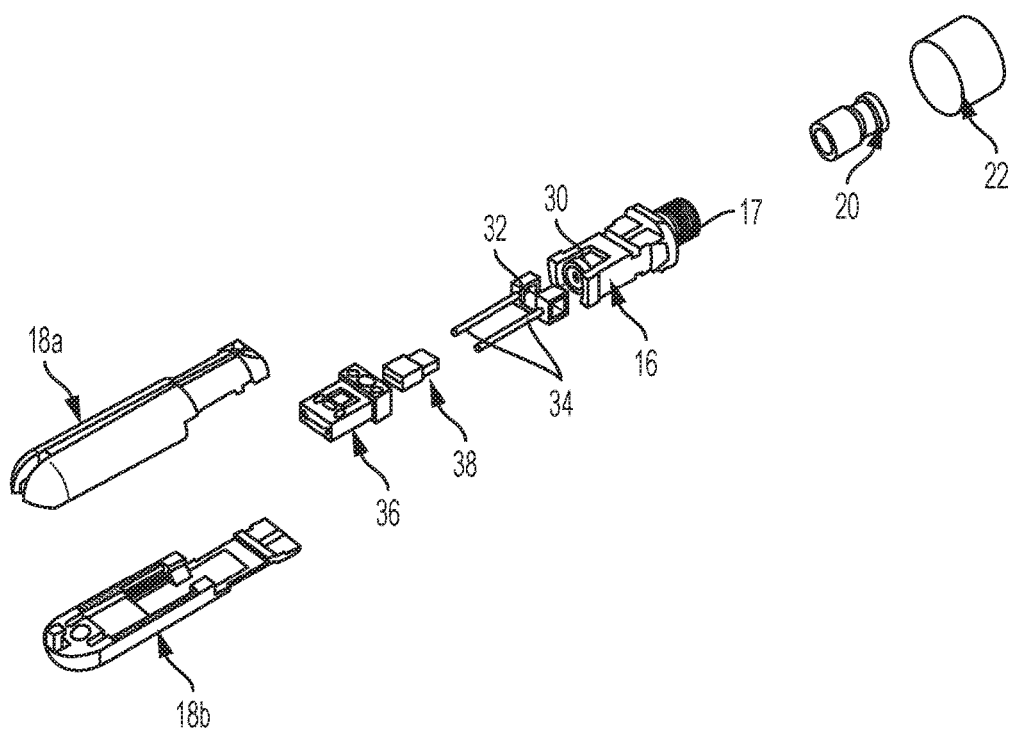
FIG. 4 depicts an assembly view of the components of FIG. 2 according to an embodiment.
Figure 5:
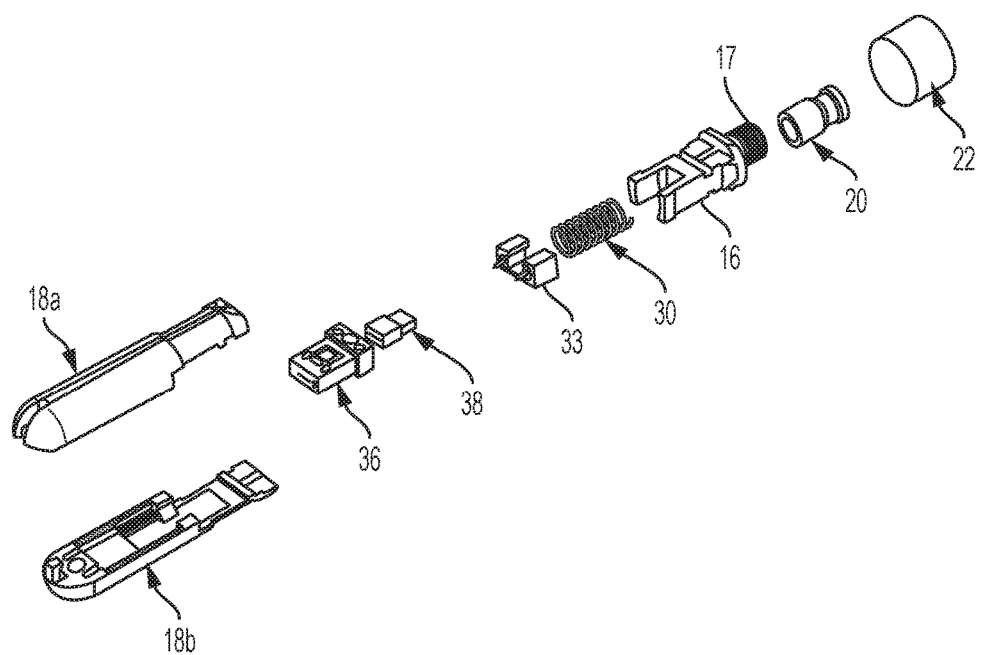
FIG. 5 depicts an assembly view of the components of FIG. 3 according to an embodiment.

FIGS. 2-5 provide general representations of a terminal assembly 10 in perspective, and dis-assembled views. FIGS. 2 and 3 provide partially assembled views of respectively, male and female connectors, with the top housing portion 18a removed to show the configuration within the housing. The representations of FIGS. 2 and 4 provide a depiction of a terminal end for a male ferrule connector, while FIGS. 3 and 5 provide a depiction of a terminal end for a female ferrule connector.

As shown in FIGS. 2 and 4, the back post member 16 may be pre-assembled with a biasing member, such as a compression spring 30, a pin holder insert 32 that includes a pair of alignment pins 34, a ferrule 36, and a ferrule boot member 38. The back post member 16 may include a back post 17 configured to be connected with a fiber optic cable 14 as discussed above. FIGS. 3 and 5 provide similar views to those of FIGS. 2 and 4, but for a female ferrule connector, the pin holder 32 may be replaced with a pin alignment insert 33 as discussed more fully below.

At least the backpost member 16 and the housing portions 18a, 18b may be configured to provide for a reduction in the overall footprint (for example, at least the cross-sectional dimension) of the connector, protect potentially fragile pieces during the deployment process, and allow for removal of the protection after the fiber has been deployed through a microduct. The cross-sectional dimension may be reduced sufficiently to provide for an assembly 10 that may fit through a microduct having a diameter of about 14 mm/10 mm (outer/inner diameters).

Figure 6:
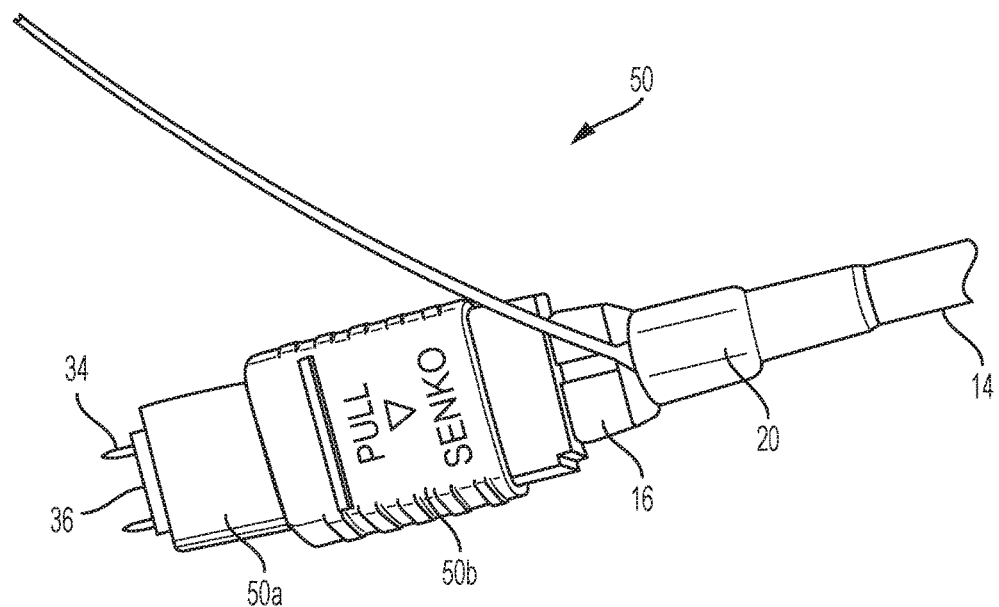
FIG. 6 depicts an assembled MPO-type connector ready for use according to an embodiment.
Figure 7A:
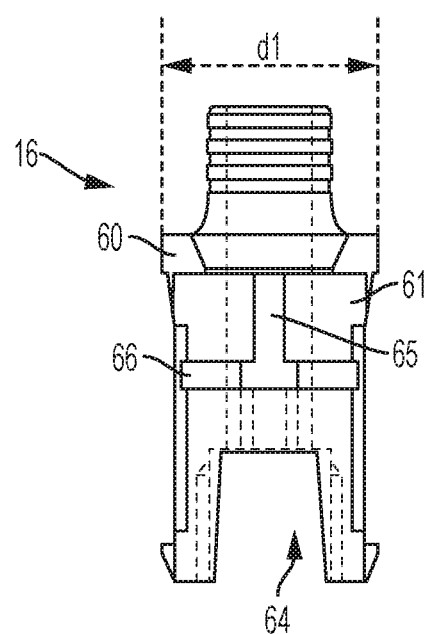
FIGS. 7a-7e depict various views of a back-post member according to an embodiment.
Figure 7B:
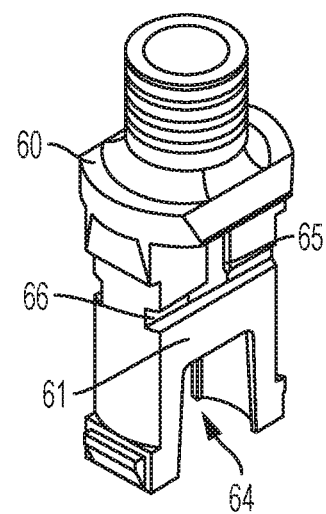
Figure 7C:
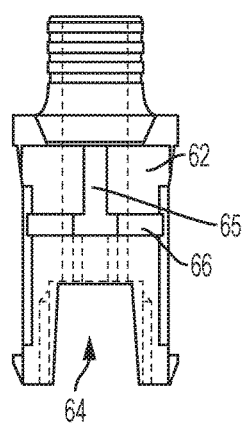
Figure 7D:
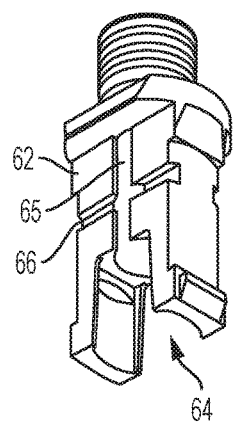
Figure 7E:
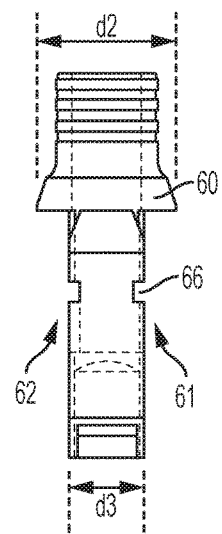

FIG. 6 provides a representation of an MPO ferrule connector 50 fully assembled and ready for use. For final assembly, the housing portions 18a, 18b may be removed exposing the pre-assembled components therein. Connector outer housing pieces 50a and 50b, for example, may then be installed to provide a ready to use connector. In a fiber optic connector, such as the MPO connector 50 shown, the backpost member 16 may be used in conjunction with the outer housing 50a and 50b to hold the connector together.

FIGS. 7a-7e provide various representative views of the back-post member 16. In an embodiment as shown, a maximum dimension d1, in at least a first cross-section dimension of the back-post member may be defined by a flange 60. The flange 60 may be of a size reduced sufficiently to allow the back-post member 16 to fit through a desired microduct without affecting the prerequisite function of having the back-post member being capable of holding the connector assembly together. In various embodiments, the maximum dimension d1 of the back post member 16 may be in a range of about 5 mm to about 9 mm. In one example, the maximum dimension d1 may be about 8.3 mm. An additional dimension d2, essentially orthogonal to the dimension d1, may be less than the dimension d1 so that when assembled with the housing portions 18a, 18b, a total cross sectional dimension that is substantially the same as the dimension d1 may be obtained so that the back-post member 16 with an attached housing 18 fits through the desired microduct. For example, the maximum dimension d2 may be in a range of about 5 mm to about 7 mm. In one example, the maximum dimension d2 may be about 6.6 mm.

Figure 8A:
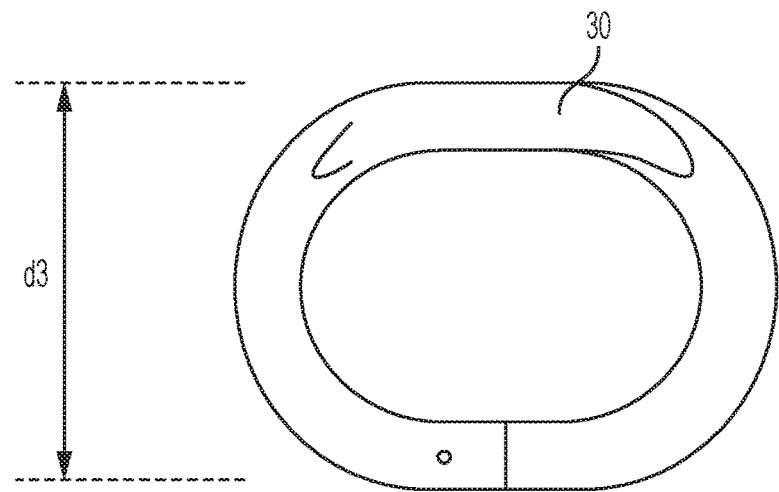
FIGS. 8a-8b depict various views of a biasing member according to an embodiment.
Figure 8B:
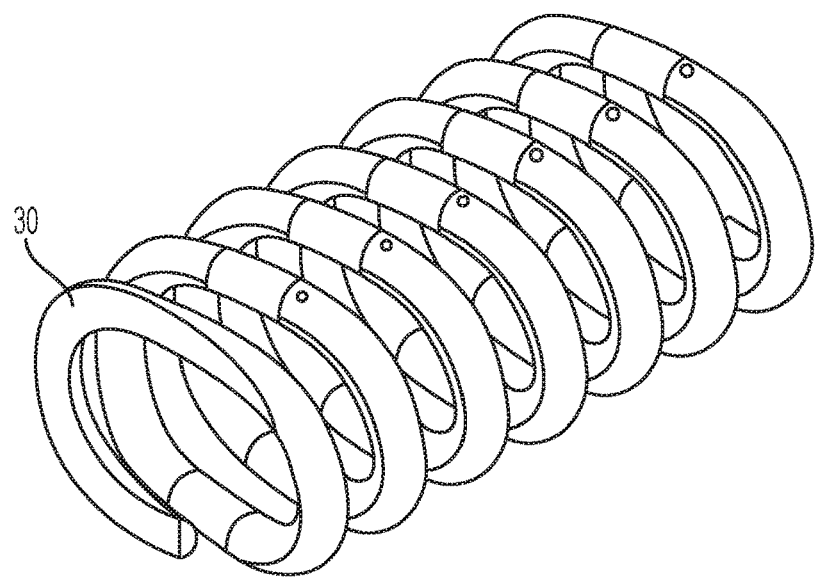
Figure 11A:
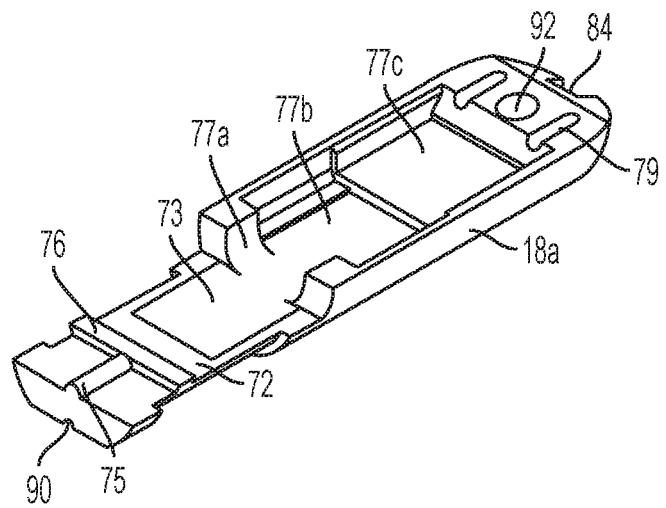
FIGS. 11a-11b depict views of the internal side of the housing components according to an embodiment.
Figure 11B:
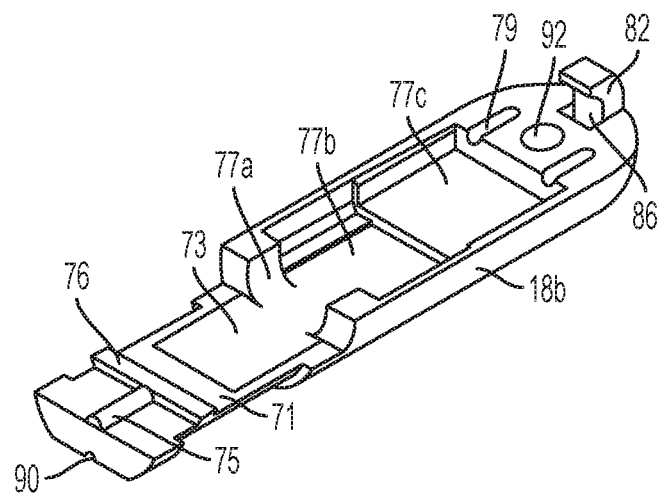

As depicted for example in FIG. 5, the back-post member 16 may have, at the back end thereof, a back-post 17 for being attached to a cable. The front end of the back-post member 16 may define an internal cavity 64 that is of a size sufficient to retain a biasing member, such as the spring 30 therein. In an embodiment as shown in FIGS. 8a and 8b, the spring 30 may be a flattened oval so that the spring essentially does not extend beyond the thickness d3 of the front end of the back-post member 16. For an embodiment in which the spring 30 may have a width that is slightly greater than d3 and extend beyond the faces 61, 62, the housing portions may include a slight cavity indentation (see 73 in FIGS. 11a, 11b) to accommodate the projecting portion of the spring. The internal configuration/dimensions of the cavity 64 may essentially match the external dimensions of the spring 30 to minimize play, or movement of the spring within the cavity.

Figure 9:
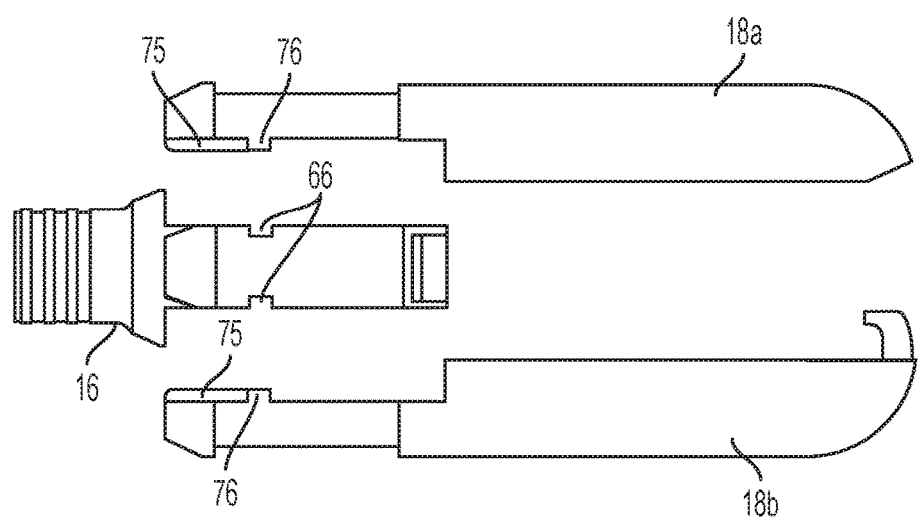
FIG. 9 provides a side view of the components of a protective housing according to an embodiment.
Figures 10A, 10B:
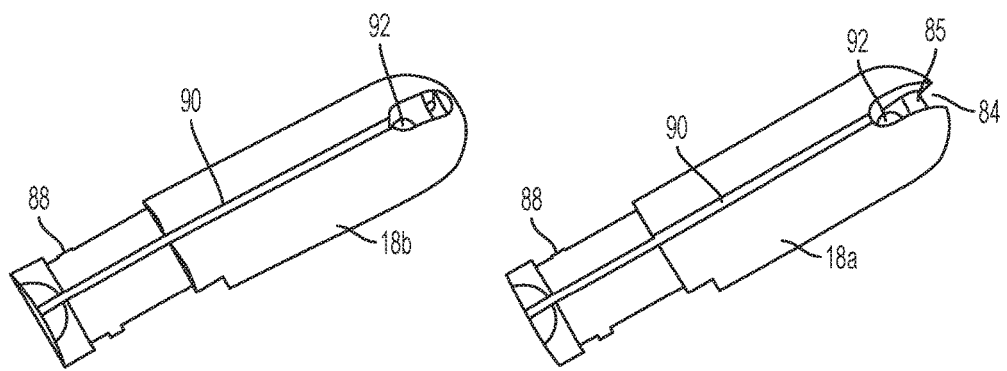
FIGS. 10a-10b depict views of the external side of the housing components according to an embodiment.

The back-post member 16 may include external faces 61 and 62, that may be configured to mate with corresponding internal faces of the housing portions 18a, 18b. To provide retentive features and also minimize play, or movement between the housing portions 18a, 18b and back-post member 16 when mated together, external faces 61 and 62 may be configured with longitudinal slots 65 and transverse slots 66 that mate with corresponding projections 75, 76 of the housing portions 18a, 18b as discussed below, and as further illustrated in FIG. 9. Alternatively, the housing portions 18a, 18b may include slots, and the faces 61 and 62 may include corresponding projections, or a combination of slots and projections could be provided on any of the components to mate with corresponding slots/projections of the mating component.

Such a configuration of slots 65, 66 and projections 75, 76 provide a method of maintaining alignment between the housing portions 18a, 18b and back-post member 16 when mated together during deployment, for example, through a conduit. In addition, for installations wherein the cable is to be pulled through a conduit via attachment of a cord, cable, or chain, etc. to the housing 18, the configuration of slots 65, 66 and projections 75, 76, also provides for a translation of the pulling force applied to the housing to the backpost, onto the crimp ring, and then ultimately to the fiber optic cable. Such a configuration may thereby allow the user to pull the terminated fiber assembly through the microduct without the connector coming apart.

FIGS. 10a, 10b, 11a and 11b provide additional perspective views of the housing portions 18a, 18b. Each of the housing portions 18a, 18b may include a mating surface 71 or 72 that is configured to be mated with surfaces 61 or 62 of the back-post member 16. In an embodiment as shown, the mating surfaces 71, 72 may include the projections 75 and 76 that may be configured to correspondingly mate with slots 65, 66 of surfaces 61 or 62. As mentioned briefly above, one or both of the mating surface 71, 72 may include an indentation 73 to accommodate the spring 30. Each of the housing portions may define internal chamber portions 77a, 77b and 77c that together provide an internal cavity for containing the pre-assembled components as discussed above.

In an embodiment, chamber portion 77a may be sized to accommodate the dimensions of spring 30 as shown in FIG. 2, wherein the external dimensions of the spring essentially match the internal dimensions of the chamber portion 77a to minimize movement of the spring within the chamber. Similarly, chamber portion 77b may be sized to accommodate the dimensions of pin holder insert 32 or pin alignment insert 33 as well as the larger dimension flanged portion of the ferrule 36, and chamber portion 77c may be sized to accommodate the dimensions of the remaining portion of ferrule 36. By providing an essentially snug fit between the chamber portions and the connector pieces contained therein, relative movement between the connector pieces, and between the connector pieces and the housing portions may be minimized or eliminated, thereby minimizing or eliminating potential damage to the connector pieces prior to and during the installation process. For male connector assemblies as shown in FIG. 2, the housing portions 18a, 18b may also include pin slots 79 configured to receive the protruding portion of the alignment pins 34 therein, as also shown in FIG. 2.

As previously mentioned, the housing portions 18a, 18b may be connected and retained together by any of several types of devices. In an embodiment as shown in FIGS. 10a, 10b, 11a and 11b, the housing portions may be joined at the front end thereof with a hook and socket configuration, wherein one of the housing portions, for example the bottom portion 18b, may be provided with a hook-shaped member 82 extending substantially transverse to a longitudinal direction of the housing portion, and the other of the housing portions, for example the top portion 18a, may be configured with a socket 84 for receiving and retaining the hook therein. The socket 84 may be configured with a retaining edge 85 configured to fit within an inset portion 86 of the hook 82. For assembly, the top housing portion 18a may be held at an angle to the bottom housing portion 18b (for example, at 90° thereto, or any other angle that may allow for connection), the retaining surface 85 may be disposed within the inset 86, and the top housing portion may be pivoted to mate with the bottom portion thereby locking the front ends of the housing portions together.

The back ends of the housing portions 18a, 18b may be provided with a recessed area 88 for receiving the heat shrink band 22 (or adhesive tape) therein. In this manner, by providing a recess for the band 22, the band 22 may not project beyond the dimensions of the housing, so that the housing essentially defines the maximum cross-sectional dimensions of the assembly 10. Once the heat shrink band 22 is shrunk, the band may thereby hold the back ends of the housing portions 18a, 18b together, so that, in conjunction with the front hook and socket, the housing portions 18a, 18b may be fastened together.

Figure 16:
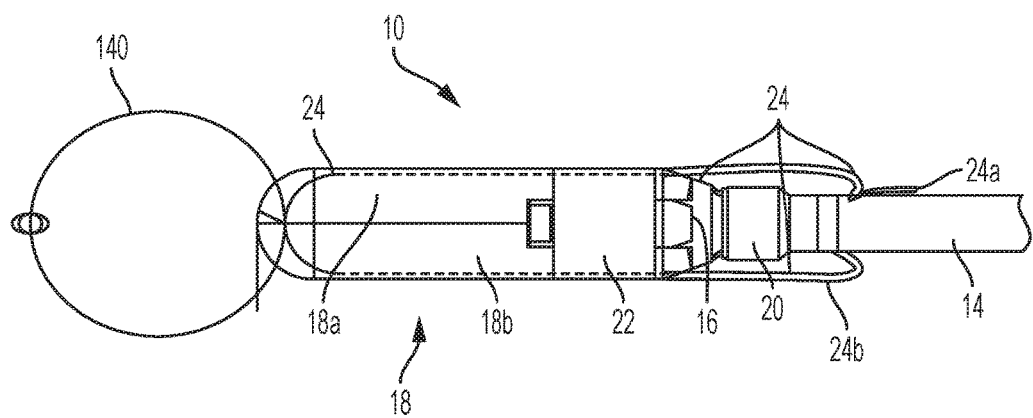
FIG. 16 depicts a pre-assembled cable end having a ripcord arranged on the crimp ring according to an embodiment.

In an embodiment, so that an additional tool, such as a knife may not be needed to cut away or remove the shrink band 22 (or alternately an adhesive tape), a ripcord 24 as shown in FIGS. 1 and 16 may be included. As represented in FIG. 1, one end 24a of the ripcord 24 may be crimped under the crimp ring 20 to fix the ripcord with the assembly 10. In another embodiment, shown in FIG. 16, both ends of the ripcord 24 may be arranged on the crimp ring 20. Each of the housing portions 18a, 18b may include a longitudinal slot 90 for receiving the ripcord 24 therein, thus also allowing the rip-cord to be contained so as not to project outwardly beyond the surfaces of the housing 18. From the crimp ring 20, the ripcord 24 may extend forwardly through the slot 90, through an opening, or hole 92 disposed towards, or at the front end of the housing portions 18a, 18b, and again rearwardly through the opposing slot 90 (shown in FIGS. 10 and 11) to extend along a length of the cable 14 and provide the free end 24b (dashed line in each of FIGS. 1 and 16 represents general location of fixed ripcord). This wrapping direction allows the trailing end of the ripcord to free float without causing added resistance as the connector moves through the microduct. In another embodiment, as shown in FIG. 16, the trailing end of the ripcord 24 may be arranged on the crimp ring 20. The ripcord 24 may be installed prior to the heat shrink band 22, so that when the heat shrink band is installed, the band will also hold the ripcord in place on the assembly 10. By pulling on the free end of the ripcord 24 the ripcord may be pulled longitudinally through the shrink band 22 thereby severing the band for removal.

After removal of the band 22 the housing portions 18a, 18b may be removed by unhinging the hook and socket thereby freeing the pre-assembled internal components from the housing 18. Final assembly of the connector housing parts 50a, 50b, for example, may then be done to complete the connector assembly. If desired, any extra ripcord 24 may be trimmed off with a knife or scissors.

In an embodiment, the front end hole 92 may be sized and configured for receiving or attaching a pull cord, or pull wire, or the like to the housing 18, to allow the housing with attached cable 14 to be pulled through a microduct. In one embodiment, as shown for example in FIG. 16, the ripcord 24 may be configured to form a loop 140 at the front portion of the housing 18.

To facilitate assembly of the housing components 18a, 18b with the back post member 16, and with the pre-assembled internal components (spring 30, pin holder insert 32/pin alignment insert 33, ferrule 36, and ferrule boot member 38), an alignment tool (not shown) may be configured to properly hold the components in relation to one another to guide proper placing and closing of the housing 18.

Figure 12A:
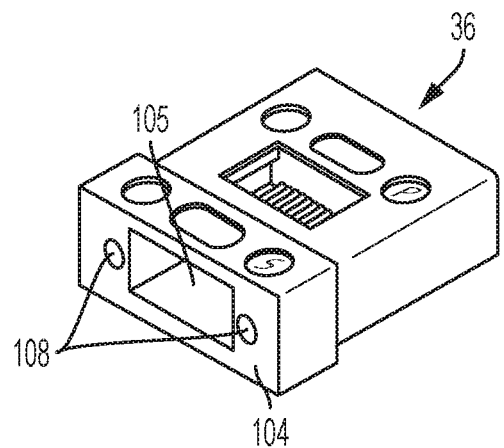
FIGS. 12a-12b depict views of a ferrule body according to an embodiment.
Figure 12B:
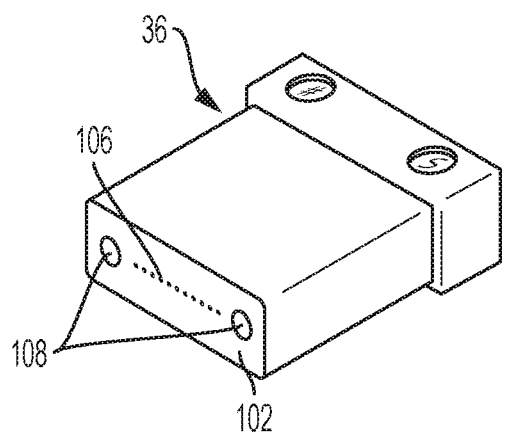

A general representation of an MPO ferrule 36 is provided in FIGS. 12a and 12b. A ferrule 36 may have a front mating end face 102, and a trailing end 104 having a cavity 105 for receiving the fibers therethrough. A leading end of the fibers 106 may be disposed in the front end face 102 for mating with another optical device. The ferrule 36 may also include guide pin holes 108 that may extent through the body thereof from the front face 102 to the trailing end 104. Guide pin holes may be configured for receiving guide pins 34 (FIGS. 2 and 4) therethrough.

Figure 13A:
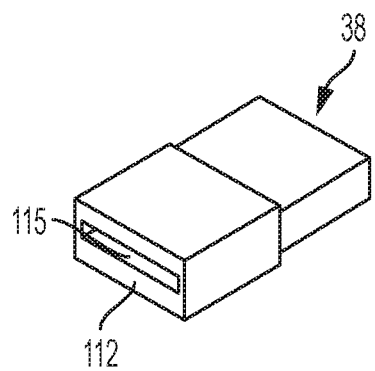
FIGS. 13a-13b depict views of a ferrule boot according to an embodiment.
Figure 13B:
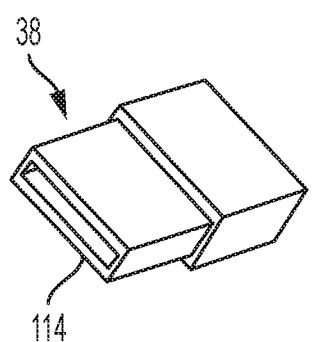

Adjacent the trailing end 104 of the ferrule 36, the assembly may include the ferrule boot 38, as shown in FIGS. 13a and 13b. The ferrule boot 38 receives the fiber stands therethrough to provide a guide and protect the fibers. The boot may have a leading end 112 for abutting the ferrule 36, a trailing end 114 and a guide passage 115 for the fibers.

Figure 14A:
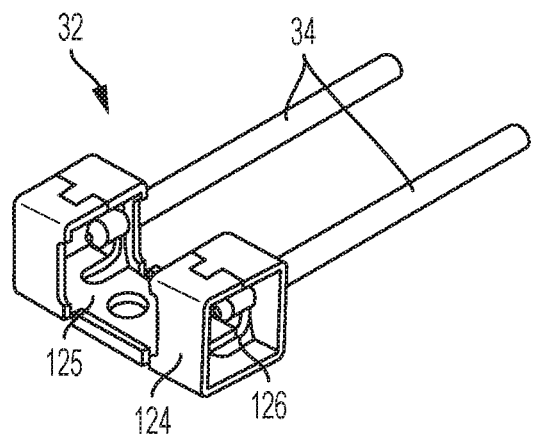
FIGS. 14a-14b depict views of a pin holder insert with alignment pins according to an embodiment.
Figure 14B:
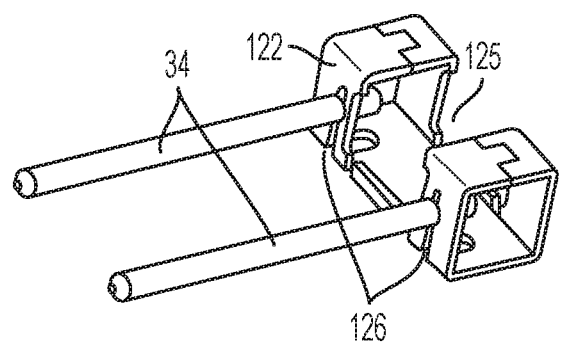
Figure 15A:
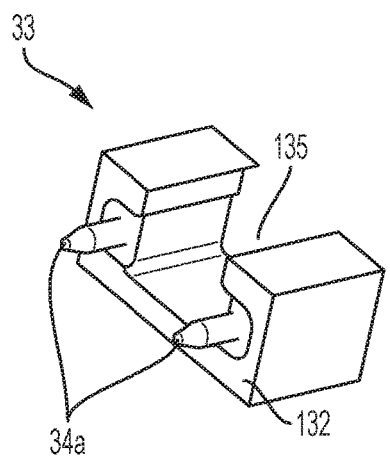
FIGS. 15a-15b depict views of a pin alignment insert according to an embodiment.
Figure 15B:
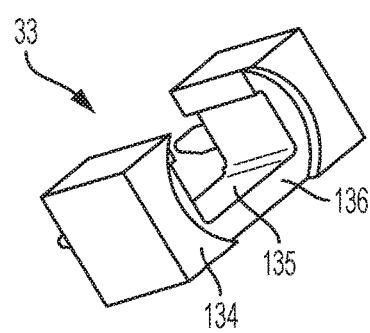

The pin holder insert 32 (FIGS. 14a and 14b) for a male connector and the pin alignment insert 33 (FIGS. 15a and 15b) for a female connector may be configured to fit around the ferrule boot 38, to receive the biasing force from the biasing member (spring 30, for example) and transfer the biasing force to the ferrule. The pin holder insert 32 may have a front face 122 for abutting the ferrule 36 and a rear face 124 for engaging the spring 30 to thereby transfer biasing force between the ferrule 36 and back-post member 16. The pin holder insert 32 may be configured to receive guide pins 34 via insertion slots 126. In an embodiment, pin holder inserts 32 may be used without pins 34 such as for female connectors instead of the inserts 33 discussed below. The insert 32 may include an internal passage 125 configured to fit around the boot 38.

The pin alignment insert 33 may have a front face 132 for abutting the ferrule 36 and a rear face 134 for engaging the spring 30 to thereby transfer biasing force between the ferrule 36 and back-post member 16. The rear face 134 may include an inset portion 136 to receive an end of the spring 30, to provide a surface to engage the spring and being configured to have essentially the same dimensions as the spring to prevent relative movement between the spring and the insert 33. The insert 33 may include an internal passage 135 configured to fit around the boot 38.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A terminal assembly for a multi-fiber optical cable, comprising:
   a back post member configured to couple to the multi-fiber optical cable;
   a ferrule;
   an insert configured to align with the ferrule, the insert comprising a plurality of alignment pins protruding through at least the ferrule; and
   a housing comprising a first housing component and a second housing component configured to couple to the first housing component so as to form at least one chamber therebetween for receiving at least the ferrule, each of the first and second housing components being external housing components and being further configured to couple to the back post member, the first housing component and the second housing component each comprising pin slots configured to receive a protruding portion of the alignment pins.

2. The terminal assembly of claim 1, wherein the at least one chamber is configured to further receive the insert.

3. The terminal assembly of claim 1, further comprising a biasing member disposed between the back post member and the insert, the back post member including a cavity configured to receive the biasing member.

4. The terminal assembly of claim 1, wherein the ferrule is an MPO ferrule.

5. The terminal assembly of claim 1, wherein a maximum first dimension of the back post member in a first transverse cross-sectional direction is in a range of about 5 mm to about 9 mm.

6. The terminal assembly of claim 5, wherein a maximum width of each of the first housing component and the second housing component is about the same as the maximum first dimension of the back post member.

7. The terminal assembly of claim 5, wherein a maximum second dimension of the back post member in a second transverse cross-sectional direction is less than the maximum first dimension so as to accommodate each of the first housing component and the second housing component.

8. The terminal assembly of claim 7, wherein the housing is configured such that a maximum dimension of the terminal assembly in a transverse direction, when the first housing component and the second housing component are coupled to the back post member, is about the same as the maximum first dimension of the back post member.

9. The terminal assembly of claim 1, wherein the back post member includes a slot, and at least one of the first housing component and the second housing component includes a projection configured to engage the slot so as to couple to the back post member.

10. The terminal assembly of claim 1, wherein the back post member includes a longitudinal slot and a transverse slot, and at least one of the first housing component and the second housing component includes a longitudinal projection configured to engage the longitudinal slot, and a transverse projection configured to engage the transverse slot.

11. The terminal assembly of claim 1, wherein the back post member includes a first external surface and a second external surface on opposite sides thereof, the first external surface being configured to mate with the first housing component and the second external surface being configured to mate with the second housing component.

12. The terminal assembly of claim 1, wherein one of the first housing component and the second housing component includes a hook and the other one includes a socket configured to receive the hook so as to couple the first housing component to the second housing component.

13. The terminal assembly of claim 1, further comprising a ripcord configured to facilitate decoupling of the first housing component from the second housing component.

14. The terminal assembly of claim 13, further comprising a heat shrink member configured to enclose the housing, wherein each of the first housing component and the second housing component includes a longitudinal slot configured to receive the ripcord positioned beneath the heat shrink member, a free end of the ripcord being accessible to allow pulling the ripcord from the longitudinal slots, thereby tearing the heat shrink member.

15. The terminal assembly of claim 13, further comprising a crimp ring configured to couple the back post member to the multi-fiber optical cable, at least one end of the ripcord being arranged on the crimp ring.

16. The terminal assembly of claim 13, further comprising a crimp ring configured to couple the back post member to the multi-fiber optical cable, at least one end of the ripcord being crimped to the multi-fiber optical cable.

17. The terminal assembly of claim 1, further comprising a ferrule boot disposed between the ferrule and the insert.

18. The terminal assembly of claim 1, wherein each of the first housing component and the second housing component has a longitudinal semi-cylindrical profile configured to facilitate passage of the terminal assembly through a microduct having an internal diameter less than or equal to about 6 mm.

19. The terminal assembly of claim 1, wherein the first housing component and the second housing component are removable from the terminal assembly and replaceable by an outer housing having a diameter greater than about 6 mm.

20. A terminal assembly for a multi-fiber optical cable, comprising:

a back post member configured to couple to the multi-fiber optical cable;

a ferrule;

an insert configured to align with the ferrule, the insert being one of a pin holder insert and a pin alignment insert;

a housing comprising a first housing component and a second housing component configured to couple to the first housing component so as to form at least one chamber therebetween for receiving at least the ferrule, each of the first and second housing components being external housing components and being further configured to couple to the back post member; and a heat shrink member configured to enclose the housing.

* * * * *